United States Patent [19]

Etaix

[11] 4,204,743
[45] May 27, 1980

[54] CONNECTOR FOR COUPLING OPTICAL FIBRES TO AN EMITTER OR RECEIVER OF LUMINOUS ENERGY

[75] Inventor: Jean-François Etaix, Paris, France

[73] Assignee: U.S. Philips Corporation, New York, N.Y.

[21] Appl. No.: 14,667

[22] Filed: Feb. 23, 1979

Related U.S. Application Data

[63] Continuation of Ser. No. 806,365, Jun. 14, 1977, abandoned.

[30] Foreign Application Priority Data

Jun. 21, 1976 [FR] France ............................... 76 18791

[51] Int. Cl.² .............................................. G02B 5/16
[52] U.S. Cl. ............................... 350/96.20; 350/96.18
[58] Field of Search ............... 350/96.20, 96.21, 96.22, 350/96.18

[56] References Cited

U.S. PATENT DOCUMENTS

| | | | |
|---|---|---|---|
| 3,582,637 | 6/1971 | Cecil, Jr. ........................... | 350/96.22 |
| 3,950,075 | 4/1976 | Cook et al. ........................ | 350/96.18 |
| 4,060,309 | 11/1977 | Le Noane et al. ................. | 350/96.18 |
| 4,078,852 | 3/1978 | Lebduska .......................... | 350/96.18 |

*Primary Examiner*—Stewart J. Levy
*Attorney, Agent, or Firm*—Marc D. Schechter

[57] ABSTRACT

A connector for connecting optical fibers to an emitter or a receiver comprises two connection elements which are adapted to be coupled and locked relative to each other. One of the connection elements encloses the end of the fiber bundle. The other element comprises an assembly which connects an optical imaging forming device to the emitter or receiver. Each of the elements comprises internal parts which, during the coupling, enable the end of the fiber bundle and the surface of the emitter or the receiver to be positioned relative to each other with high accuracy, in the transverse as well as in the axial direction, the emitter or receiver and the bundle thus being optically coupled by the optical device.

6 Claims, 1 Drawing Figure

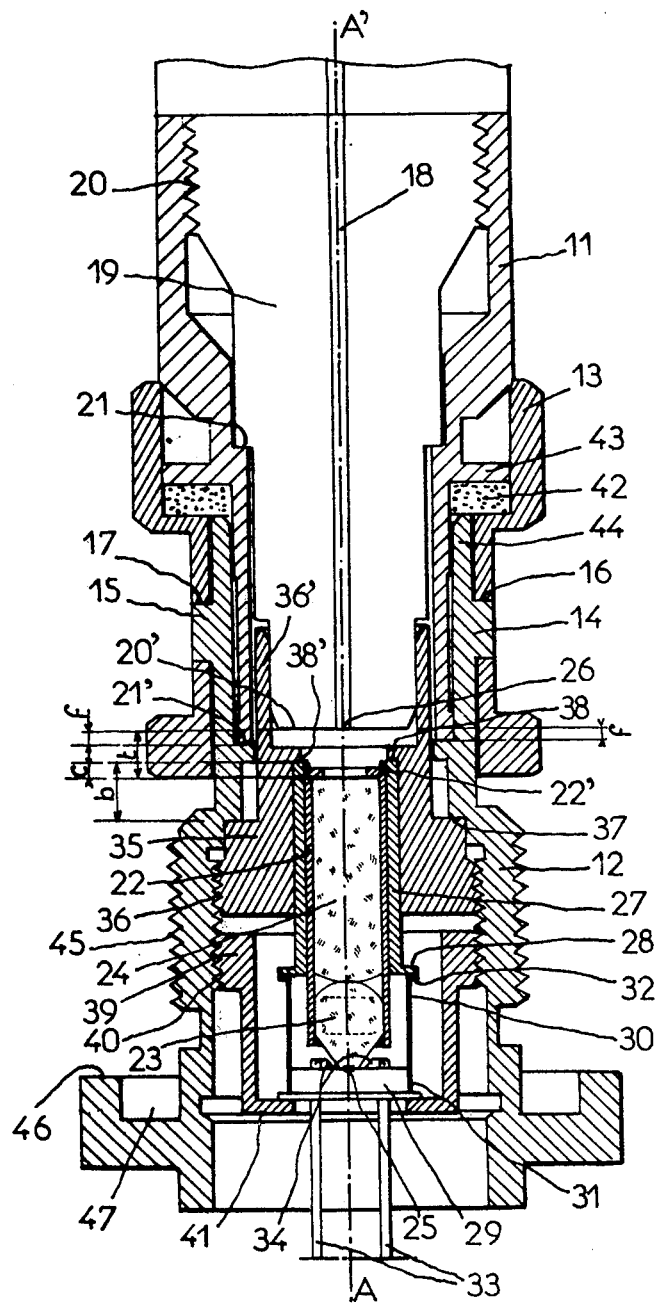

CONNECTOR FOR COUPLING OPTICAL FIBRES TO AN EMITTER OR RECEIVER OF LUMINOUS ENERGY

This is a continuation of application Ser. No. 806,365, filed June 14, 1977, now abandoned.

BACKGROUND OF THE INVENTION

The present invention relates to a connector for coupling optical fibers to a light emitter or light-receiver, comprising an optical connection device between optical fibers and said emitter or receiver.

Hereinafter, a bundle of fibers is to be understood to mean an optical light conductor comprising either a single optical fiber or a plurality of fibers which are arranged one adjacent the other in the longitudinal direction.

Nowadays, communication systems are being developed in which optical fibers are used as conductors for light waves modulated by the information to be transmitted. These fibers are thus utilized for long distance in the same manner as electrical conductors. In such systems use can be made of visible and invisible light.

The communication networks used comprise bundle-to-bundle connections and connections between fiber bundles and devices for either injecting light energy into the network or detecting light energy emitted from the network. For the designed and developed systems to be operational, it is necessary that their maintenance can be readily performed and that faulty elements of the network can be readily replaced. This must be the case, for example, for the light emitters and the light receivers. Therefore, connection devices should be available to the user for connecting the fiber bundle to the emitter or receiver, and these devices should consist of two parts, one part accommodating the emitter or the receiver, while the other part is integral with the fiber bundle, the two parts being connected one into the other by way of a locking system which keeps one of the parts in position relative to the other part.

The present state of the art, already knows devices of this kind, whose construction is similar to that of connectors for electrical cables with a co-axial conductor. A device of this kind is described in U.S. Pat. No. 3,948,582. This connector is constructed to provide direct connection of an opto-electronic emitter or receiver to a fiber bundle. The construction of this connector includes facilities to ensure precise positioning of said element, in the axial as well as in the transverse direction, relative to the entrance face of the fiber bundle and its axis in order to achieve optimum coupling from an energy point of view.

In spite of the steps taken, the efficiency of the coupling obtained is always comparatively low, notably in the case where the emitter or the receiver has an emission or reception surface which is substantially smaller than the sectional area of the end of the fiber bundle. It is known that the acceptance angle $\alpha$ is one of the characteristic properties of optical fibers. Each ray in the fiber travels at which an angle with the optical axis of the fiber which exceeds half $\alpha$ traverses the lateral surface of the fiber core instead of being reflected thereby, so that it does not contribute to the transport of light energy along the fiber. Consequently, if the surface area of the emitter is much smaller than the entrance face of the fiber bundle, in the case of emission, a major part of the luminous energy emitted is not utilized, notably the energy which is emitted at angles of incidence in excess of half the angle of acceptance $\alpha$, this part being larger as the angle $\alpha$ is smaller, while, moreover, the fibers at the periphery of the bundles are apt not to transmit any energy at all. The same is applicable to reception, notably if the receiver has dimensions which are smaller than the sectional area of the end of the bundle; a quantity of light energy transported in the bundle is then not received by the receiver, not even if said receiver is placed in contact with the end section of the bundle.

These drawbacks are mitigated in accordance with the present invention where an optical device is introduced between the end of the fiber bundle and the emitter or receiver. The optical device introduced has dimensions and properties such that it optically connects the surface of the emitter or the receiver to the entrance section of the fiber bundle, the diameter of the image of said surface, produced by the optical system, being substantially equal to the diameter of the fiber bundle, the image aperture angle being at least equal to half the acceptance angle of the fiber bundle. This optical device is described in Ser. No. 748,559, filed on Dec. 8, 1976, by the assignee of the present application, U.S. Pat. No. 4,102,559.

As a result, the invention enables one to efficiently inject light energy from an emitter into a fiber bundle, where the fiber bundle has a small acceptance angle and a large aperture, and where the emitter has a surface which is much smaller than the aperature of the fiber bundle.

The introduction of an optical device of this kind requires a high precision in the axial and transverse directions for the positions occupied by the end of the fiber bundle and the emitter or receiver. Any lack of precision has an adverse effect on the optical connection between them, especially because of the essential enlargement of the optical device and hence has an adverse effect on the quality of the light coupling between the fiber bundle and the emitter or receiver.

An object of the invention is to satisfy these precision requirements. To this end, a connector for connecting an optical fiber bundle to a light emitter or light receiver, according to the invention comprises first and a second connection elements which can be coupled and locked one into the other. The two connection elements each comprise two cylindrical envelopes on the outer face of which are arranged coupling and locking members of the type known for connectors for electrical coaxial cables. The first connection element also comprises a part for mechanically locking the fiber bundle and for holding and supporting said fiber bundle, said mechanical part being integral with the envelope. In the second element there is further provided an optical assembly comprising an emitter or receiver and an optical image forming device, the axis of which is aligned with the axis of said emitter or receiver. This assembly is supported, guided, and held by means which are integral with the envelope. The means for supporting, guiding and holding, inside the two connection elements are arranged so that they accurately position, in the axial as well as in the transverse direction, the end of the fiber bundle and either the emitter or the receiver with respect to each other in the coupled condition. The end of the fiber bundle and the face of the emitter or the receiver are optically connected by the optical device.

The optical device included in a preferred embodiment of this connector is as disclosed in the aforesaid U.S. Pat. No. 4,102,559.

Hereinafter, a preferred embodiment of a connector according to the invention will be described with reference to the accompanying drawing.

BRIEF DESCRIPTION OF THE DRAWINGS

The sole FIGURE of the drawing is a sectional view of the connector, taken along one of its symmetry planes.

DESCRIPTION OF THE PREFERRED EMBODIMENTS

The connector is rotationally-symmetrical around the axis AA'. The envelope of a first connection element of this connector is denoted by the reference numeral 11, while the envelope of a second connection element is denoted by the reference numeral 12. These two envelopes are coupled and locked relative to each other. The coupling locking means are of a known type used for connectors for cables having metallic coaxial cores. These means are formed, for example, by a ring 13 which is movable around the envelope 11 and which is integral with this envelope, and cams 14 and 15 which are provided on the envelope of the second element 12. The ring is provided with lateral apertures 16 and 17 which are engaged by the cams during the assembly and locking, these operations being realized by rotation of the ring 13.

Obviously, use can also be made of other coupling and locking means, known for connectors for electrical coaxial cables, for the envelopes 11 and 12, notably those means comprising a ring which is integral with 11 and which is screwed onto a thread on the other side of 12.

As is shown in the FIGURE, the connection may be realized by means of a screw (not shown) which is screwed on the thread 45, thus enabling said screw to be pulled against the part 46 of the envelope 12 which comprises a recess 47 with an elastic seal for connection in a suitably sealed manner.

The fiber bundle 18 is arranged along the axis AA' inside the first connection element of the connector and it is located in the mechanical part 19 for rotation about the axis AA'. This part 19 is screwed onto the envelope 11 by way of a thread 20. It comprises a shoulder 21 which abuts against the part 11 when it is screwed on. The positions of the shoulder 21 on the part 19 and of the abutment on the envelope 11 are such that the face of the part 19 as well as the face of the optical fiber bundle 18 are situated inside the envelope 11 in the plane 20' at a distance f from the outer edge 21' of said envelope. In the case of series production of the device, this distance f must be very accurately maintained in order to enable interchanging of the connection elements of the connector.

The other connection element of the connector comprises a number of parts i.e. an optical connection assembly which associates an optical image forming device with a light receiver or a light emitter, mechanical guiding means which serve to ensure the mutual, transversal centering of said optical assembly and the mechanical part 19 which positions the fiber bundle 18 as well as to ensure the axial positioning of said optical assembly, and mechanical means for holding the optical assembly inside the envelope 12.

As is shown in the FIGURE, the first element of the connector may comprise, like known connectors for electrical coaxial cables, a ring 42 of a flexible material which bears against the metallic shoulder 43 of the envelope 11 and against which the end 44 of the envelope 12 abuts, so that after the locking of the envelopes 11 and 12 of the connector, its interior is sealed from the surroundings.

The optical assembly comprises, accommodated inside a cylindrical holder 22, an optical device, which in this case consists of lenses 23 and 24, which is held inside said holder 22, for example, by glueing. This optical device optically connects the emitter or receiver 25 to the end 26 of the fiber. In this elaborated method according to the invention, centering means are provided for making the optical axis of the optical device coincide with the receive direction of the receiver or with the emission direction of the emitter. For this purpose, the holder 22 is arranged in a cylindrical sleeve 27 which has an internal diameter equal to that of the holder 22. The holder 22 is rendered integral with this sleeve 27 by glueing, for example, at the area 22'. This sleeve 27 is provided on one of its ends with a collar 28 which is perpendicular to the side wall.

Moreover, a cylindrical support 29 for the receiver or emitter 25 is rendered integral with a cylindrical tube 30, for example, by glueing, or by electrical soldering along the outer edge 31 of the support 29. The upper edge 32 of the tube 30 is fixed to the collar 28 of the sleeve 27 by electrical soldering or glueing, so that the assembly formed by the receiver or emitter and the optical device forms an integral unit. The soldering or glueing of collar 28 and edge 32 takes place when the optical axis of the optical lenses 23, 24 coincides with the axis of the emitter or the receiver 25. Adjustment is effected by displacement of 25 in its plane, collar 28 and edge 32 then sliding relative to each other.

The centering principle is, for example, as follows, assuming that the reference 25 denotes an emitter. The emitter operates and behind the optical device radiation is detected by means of a receiver which has a suitable aperture placed on the optical axis of the optical device. When the detected radiation is optimum, collar 28 and edge 32 are soldered together. In the FIGURE, the reference numeral 33 denotes output conductors of the receiver or the emitter 25, while the reference numeral 34 denotes internal connections between 25 and these conductors 33.

Preferably, as is shown in the FIGURE, the lens 23 is tapered to form a truncated cone in order to facilitate its contacting the emitter or receiver 25 without being obstructed by the connections 34.

The second connection element is provided with means for guiding and means for rigidly holding the optical assembly in said envelope, in order to axially and transversely align the optical assembly with the fiber bundle.

The optical assembly is introduced into the guiding piece 35 which is screwed into the envelope 12 by way of the thread 36. The cylindrical end 36' of this guiding piece 35 has an inner diameter which is equal to the outer diameter of the part 19 in the vicinity of the end of the fiber 26, said part 19 projecting into 36'. This piece 35 has a shoulder 37 and an abutment 38. The shoulder 37 abuts against a tapered abutment in the envelope 12. The abutment 38 of the piece 35 arrests the sleeve 27. The reference numeral 39 denotes a part for holding the optical assembly inside the guiding piece 35. This part is screwed, by way of the thread 40, onto the envelope 12 and exerts a pressure on the optical assembly by way of its portion 41.

The position occupied by the optical assembly in the envelope 12 is such that once the coupling of the two connection elements of the connector has been realized, the end of the fiber bundle 26 is optically connected to the receiver or emitter 25 by the optical device. This is achieved by proportioning the distance b between the shoulder 37 and the abutment 38 of the part 35 while taking onto account the image width t of the optical system, the distance c between the exit face of said optical device and the end 38' of the piece 35 as well as the already said distance f between the end 21' of the envelope 11 and the end 26 of the fiber. Thus, for series manufacture interchangeability of one of the connection elements of the connector with an element of the same type is ensured.

For optimum optical adaptation of the emitter or receiver to the optical device, in accordance with the invention an immersion liquid may be introduced, said liquid being transparent for the radiation between the optical device and said emitter or receiver. This liquid may be a lubricating adhesive having a suitable refractive index which facilitates the displacement of the emitter or receiver with respect to the optical device when the optical axes of the receiver or the emitter and the optical device are adjusted to be coincident.

Preferably, in accordance with the invention use is made, in a non-restrictive manner, of an optical device as described in the aforesaid U.S. Pat. No. 4,102,559, the principal characteristics of which, as regards the coupling between emitter and optical fiber bundle, will be repeated, below. The optical device comprises a first plano-convex lens which is arranged in the propagation direction of the light, followed by a second plano-convex lens, both lenses being very thick and their axes being coincident with that of the fiber bundle at its entrance. Said lenses are arranged so that the convex side of one lens faces the convex side of the other lens. The emitter of luminous energy is directed substantially perpendicularly to said axis in the vicinity of the center of the plane side of said first lens, and the entrance section of the fiber bundle is being situated in the vicinity of the center of the plane side of said second lens. An immersion liquid which is transparent for the conducted radiation may optionally be introduced between the source and the lens and possibly between the lens and the fiber bundle. The radii of curvature of the doptric faces of the various lenses, their diameter, their thickness and the refractive indices of their constituent materials are chosen such that the device formed by the two lenses optically couples the emitter to the entrance section of the fiber bundle, the diameter of the image of the emitter being substantially equal to the diameter of the fiber bundle, and the aperture angle of the image being at least equal to half the acceptance angle of the fiber bundle. The ratio between the radii of the convex dioptric faces is chosen such that spherical aberration is at a minimum for the enlargement and the refractive indices of the chosen lens materials.

In accordance with a variant of the invention, the optical device used is substantially as described in the aforesaid U.S. Pat. No. 4,102,559. In accordance with this variant, a thin glass layer of said second plano-convex lens is replaced at the plane dioptric side by a layer of air in order to obtain a larger width of the image, for example, in the order of magnitude of 1 to 2 mm, for the optical device thus facilitating the coupling and locking of the two elements of the connector without the risk of damage to the plane face of said second lens (the lens 24 in the FIGURE) and to the end 26 of the fiber bundle.

Obviously, the emitter can be replaced by a receiver in this preferred embodiment and variant in accordance with the invention.

What is claimed is:

1. A device for connecting an optical fiber bundle to a light emitter or receiver comprising: a first connection element and a second connection element which can be coupled with the first connection element and locked thereto;

said first connection element comprising:
    a first cylindrical envelope, having coupling and locking means; and
    a mechanical part for locking, holding and supporting the optical fiber bundle, said part being integral with the first envelope;

said second connection element comprising:
    a second cylindrical envelope, having coupling and locking means arranged to cooperate with the coupling and locking means of the first cylindrical envelope;
    an optical assembly which includes an emitter or a receiver and an optical image forming device, said device and said emitter or receiver having axes which are mutually aligned; and
    means for guiding and rigidly holding said assembly in said second envelope, said means being arranged to rigidly and accurately position, in the axial as well as in the transverse direction, the optical assembly with respect to the fiber bundle, whereby when the first and second connection elements are coupled, the end of the fiber bundle is optically coupled to the emitter or receiver.

2. A device for connecting an optical fiber bundle to a light emitter or receiver, as claimed in claim 1, wherein the optical assembly further comprises centering means for transversely aligning the axes of the optical device and the emitter or receiver.

3. A device for connecting an optical fiber bundle to a light emitter or receiver, as claimed in claim 2, wherein the centering means comprises:
    a cylindrical sleeve, for holding the optical image forming device, said sleeve having side walls and a collar which extends transversely from the side walls;
    a cylindrical support for the emitter or receiver; and
    a cylindrical tube having opposite edges, one edge being fixed to the cylindrical support and the other edge being fixed to the collar of the sleeve in such a position that the axes of the optical device and of the emitter or receiver are substantially aligned.

4. A device as claimed in claim 1, 2 or 3 wherein the optical image forming device comprises a first plano-convex lens which is arranged in the propagation direction of the light, followed by a second plano-convex lens, both lenses being very thick and their axes being coincident with that of the fiber bundle at its entrance, said lenses being arranged so that the convex side of one lens faces the convex side of the other lens, the light emitter or receiver being directed substantially perpendicularly to said axes in the vicinity of the center of the plane side of said first lens, the entrance section of the fiber bundle being situated in the vicinity of the center of the plane side of said second lens, an immersion liquid which is transparent for the conducted radiation being introduced between the emitter or the receiver and the first lens, the radii of curvature of the dioptric faces of the lenses, their diameter, their thickness and the refractive indices of their constituent materials being such that the device formed by the two lenses optically couples the emitter or receiver to the entrance section of the fiber bundle, the diameter of the image of the emitter or receiver being substantially equal to the diameter of the fiber bundle, the aperture angle of the image being at least equal to half the acceptance angle of the fiber bundle, the ratio between the radii of the convex dioptric faces being such that the spherical aberration is minimum for the enlargement and the refractive indices of the chosen lens materials.

5. A device as claimed in claim 1, 2 or 3 wherein the mechanical part for holding and supporting the fiber bundle in said first connection element, comprises a shoulder which abuts against a tapered abutment in the envelope of the first connection element, the positions of the shoulder and the abutment being chosen such that the fiber bundle abuts in the envelope at a given distance from the end of said envelope.

6. A device as claimed in claim 1, 2 or 3 wherein the optical assembly in the second connection element is provided with a cylindrical sleeve which is introduced into a supporting and guiding part which is integral with the envelope of said second element, said supporting and guiding part comprising a shoulder, abutting against a tapered abutment in said envelope, and an abutment which contacts one end of the sleeve, the distance along the axis of the device, separating the shoulder from the abutment of said supporting part, being such that the optical image forming device connects the emitter or receiver to the entrance face of the fiber bundle in the coupled condition of the two connection elements of the connector.

* * * * *